(12) United States Patent
Goennenwein et al.

(10) Patent No.: US 8,972,133 B2
(45) Date of Patent: Mar. 3, 2015

(54) METHOD FOR DETECTING THE CLUTCH CONDITION

(75) Inventors: Ulrich Goennenwein, Untergruppenbach (DE); Muhammad Rauf Hameed, Heilbronn (DE); Ruediger Poggenburg, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 582 days.

(21) Appl. No.: 13/197,120

(22) Filed: Aug. 3, 2011

(65) Prior Publication Data

US 2012/0041657 A1    Feb. 16, 2012

(30) Foreign Application Priority Data

Aug. 11, 2010 (DE) .................. 10 2010 039 181

(51) Int. Cl.
*F16D 48/00* (2006.01)
*F16D 48/06* (2006.01)

(52) U.S. Cl.
CPC ...... *F16D 48/06* (2013.01); *F16D 2500/30401* (2013.01); *F16D 2500/3115* (2013.01); *F16D 2500/70458* (2013.01)
USPC .............................................. 701/67; 701/68

(58) Field of Classification Search
CPC . B60W 10/02; B60W 10/023; B60W 10/026; B60W 2510/0638; B60W 2510/0652; B60W 2510/0657; B60W 2510/0661; B60W 2520/26; B60W 2520/263; B60W 2520/266; B60W 2520/28; B60W 2520/30; B60W 2520/40; B60W 2520/403; B60W 2520/406; B60W 2710/021; B60W 2710/022; B60W 2710/023; B60W 2710/025; B60W 2710/026; B60W 2710/027; B60W 2510/0208; F16D 2500/30401; F16D 2500/3065; F16D 2500/3066; F16D 2500/3067; F16D 2500/3068; F16D 2500/3081; F16D 2500/30812; F16D 2500/30814; F16D 2500/30816; F16D 2500/30818; F16D 2500/3114; F16D 2500/3115; F16D 2500/3117; F16D 2500/3118; F16D 2500/50227; F16D 2500/50816; F16D 2500/70422; F16D 2500/70424; F16D 2500/70458; F16D 2500/7046; F16D 2500/70663; F16D 2500/7108; F16D 2500/7109; F16H 2061/12; F16H 2061/1276
USPC ..................................................... 701/67, 68
See application file for complete search history.

(56) References Cited

U.S. PATENT DOCUMENTS

| | | | |
|---|---|---|---|
| 7,503,312 B2 * | 3/2009 | Surnilla et al. ........... | 123/406.45 |
| 8,359,146 B2 * | 1/2013 | Amato ............. | 701/70 |
| 2002/0047417 A1 * | 4/2002 | Tebbe ............ | 310/114 |
| 2002/0183165 A1 * | 12/2002 | Mack et al. .................. | 477/174 |
| 2009/0306869 A1 * | 12/2009 | Wandel ........... | 701/67 |

* cited by examiner

*Primary Examiner* — Jerrah Edwards
(74) *Attorney, Agent, or Firm* — Kenyon & Kenyon LLP

(57) ABSTRACT

A method for detecting the clutch condition in engine-powered vehicles. To ensure a reliable detection of the clutch condition even in extreme driving situations, the engine torque of at least one vehicle engine is increased or reduced automatically by pulses and the response of the engine to the torque pulse is evaluated.

3 Claims, 1 Drawing Sheet

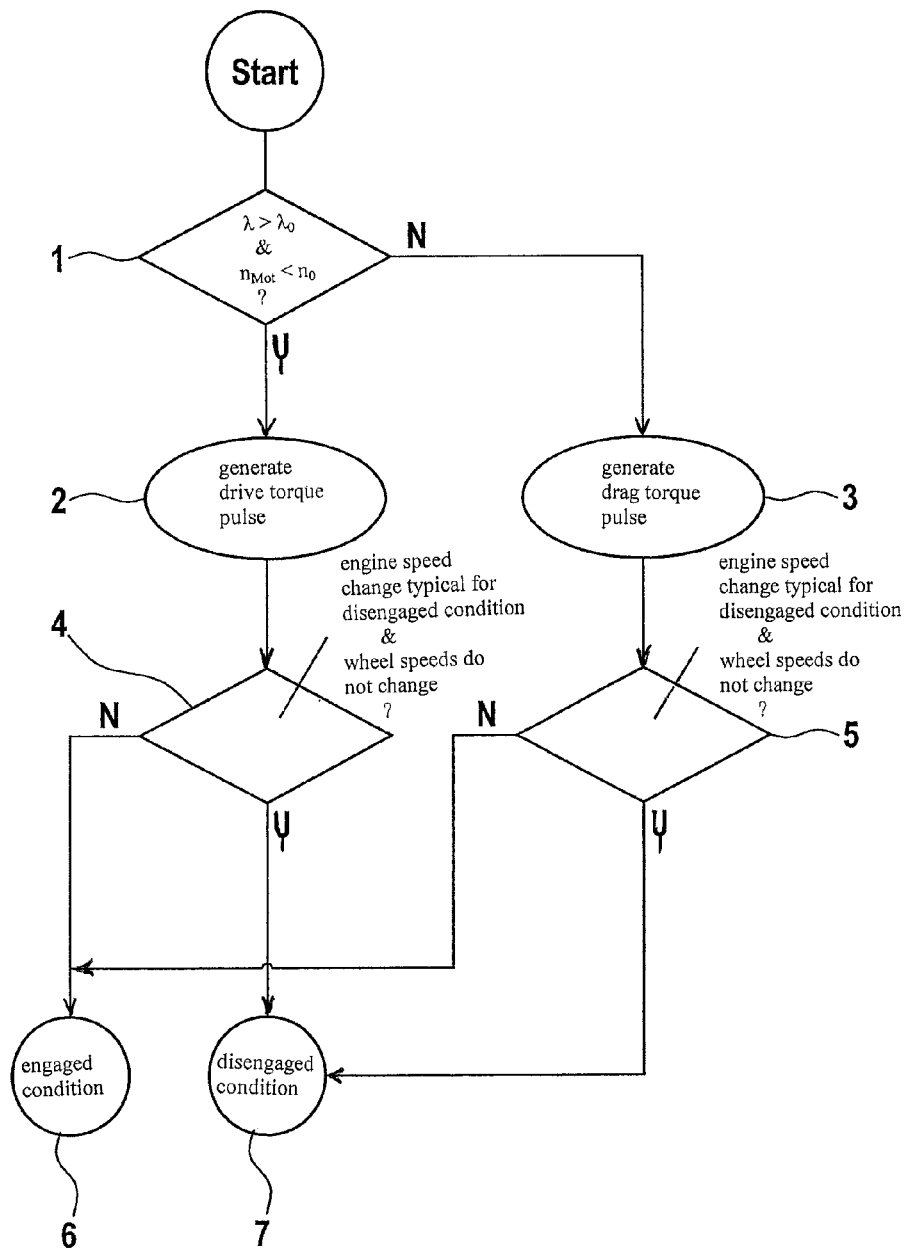

METHOD FOR DETECTING THE CLUTCH CONDITION

FIELD OF THE INVENTION

The present invention relates to a method for ascertaining the clutch condition "engaged" or "disengaged" and a control unit having a corresponding algorithm.

BACKGROUND INFORMATION

It is known from the related art to detect the clutch condition by evaluating the engine torque and the wheel speeds. Under normal conditions, this method functions sufficiently well. However, it delivers relatively unreliable results in driving situations in which the wheels are braked strongly and begin to slip. During an ABS regulation, the wheels are namely exposed to a high dynamic caused by brake pressure modulations. In such a condition, the analysis of the wheel and engine characteristics alone does not provide unambiguous information concerning the clutch condition.

SUMMARY OF THE INVENTION

It is therefore an object of the present invention to provide a method for detecting the clutch condition in which it is also possible to detect the clutch condition even in extreme driving situations such as, for example, during an ABS braking.

This object is achieved according to the present invention.

According to the present invention, an engine torque pulse is to be applied, via which the engine torque is increased or reduced temporarily and the response of the engine to the torque pulse is to be evaluated. If the engine speed follows a predefined characteristic curve which is typical for the disengaged condition, it may be assumed that the clutch is disengaged. If the engine speed does not follow the characteristic curve, an engaged condition must be assumed. The corresponding reference characteristic curve may be stored in, for example, a control unit. Alternatively, for example, it would also be possible to compare and evaluate the increase in the engine speed or another characteristic variable using a corresponding reference value.

According to a preferred specific embodiment of the present invention, the wheel speed of at least one driven wheel is measured in addition to the engine characteristics, and the correlation between the engine speed and the wheel speed is evaluated. For example, this makes it possible to detect the clutch condition "engaged" if the correlation of the two variables is greater than a predefined threshold value. The clutch condition "disengaged" is preferably detected if the behavior of the engine and the driven wheels is extremely different and the correlation between the two elements is low. For example, the rotational speeds or velocities of the forenamed elements may be compared with one another as a measure of the correlation.

The engine torque pulse is preferably fixed to an amount, for example, ranging between 10 Nm and 40 Nm.

The applied engine torque pulse may optionally be a drive torque pulse or a drag torque pulse. The decision as to whether a drive torque pulse or a drag torque pulse is triggered is preferably a function of the degree of the wheel slip of at least one driven wheel and/or of the engine speed.

If the wheel slip (brake slip) is, for example, greater than a predefined threshold value and the engine speed is lower than a predefined threshold value, a drive torque pulse is preferably triggered. If, however, the wheel slip is lower than a predefined threshold value or the engine speed is greater than a predefined threshold value, a drag torque pulse is preferably triggered.

The triggering of an engine torque pulse and evaluation of the relevant signals are preferably performed by a control unit in which a corresponding algorithm is stored.

BRIEF DESCRIPTION OF THE DRAWING

FIG. 1 shows a schematic flow chart for representing the method steps for detecting the clutch condition.

DETAILED DESCRIPTION

FIG. 1 shows a schematic flow chart of a method for clutch detection. It is checked in step 1 if wheel slip $\lambda$ of at least one driven wheel is greater than a predefined threshold value $\lambda_0$ and in addition if engine speed $n_{Mot}$ is lower than a predetermined threshold value $n_0$. If wheel slip $\lambda$ is greater than threshold value $\lambda_0$ and engine speed $n_{Mot}$ is lower than threshold value $n_0$, a drive torque pulse is generated (step 2). If, on the other hand, at least one of the named conditions is not met (case N), a drag torque pulse is generated in step 3.

After step 2, it is monitored in step 4 if the change in engine speed occurs at a characteristic rate of increase as is typical for the disengaged condition and how wheel speeds $n_{Rad}$ behave in comparison to this. If the response of the engine to the pulse shows a curve typical for the disengaged condition and the wheel speeds do not change or change only slightly, a disengaged condition is detected in step 7. If, on the other hand, at least one of the conditions in step 4 is not met, the engaged condition is detected (step 6).

After a drag torque is exerted in step 3, it is again monitored in step 5 if the engine speed drops at a predefined rate of increase which is typical for the disengaged condition and how the wheels behave in comparison to this. If engine speed $n_{Mot}$ follows a characteristic curve in which the wheel speeds do not change or change only slightly, a disengaged condition is detected in step 7. If, however, the behavior of the wheels correlates strongly with the engine speed, an engaged condition is detected (step 6).

A control unit is preferably used for the automatic generation of an engine torque pulse and the evaluation of the rotational speed values.

With the aid of the method described above, it is possible in a simple manner, even in extreme driving situations such as, for example, ABS braking, to determine an engaged or disengaged condition of the clutch.

What is claimed is:

1. A method for detecting a clutch condition in an engine-powered vehicle, comprising:
   automatically increasing or reducing an engine torque of at least one vehicle engine by applying a torque pulse to the at least one vehicle engine; and
   evaluating a resulting response of the engine to the applied torque pulse to determine whether the clutch is one of engaged or disengaged;
   wherein at least one of a wheel slip of at least one driven wheel and an engine speed is monitored, and one of a drive torque pulse or a drag torque pulse is exerted as a function of a degree of the at least one of the wheel slip and the engine speed.

2. The method according to claim 1, wherein a drive torque pulse is triggered if the wheel slip is greater than a first predefined threshold value and the engine speed is lower than a second predefined threshold value, and a drag torque pulse is triggered if the wheel slip is lower than the first threshold value or the engine speed is greater than the second threshold value.

3. A non-transitory computer-readable data storage medium storing a program having program codes which, when executed on a computer, performs a method for detecting a clutch condition in an engine-powered vehicle, the method comprising:

automatically increasing or reducing an engine torque of at least one vehicle engine by applying a torque pulse to the at least one vehicle engine; and evaluating a resulting response of the engine to the applied torque pulse to determine whether the clutch is one of engaged or disengaged;

wherein at least one of a wheel slip of at least one driven wheel and an engine speed is monitored, and one of a drive torque pulse or a drag torque pulse is exerted as a function of a degree of the at least one of the wheel slip and the engine speed.

\* \* \* \* \*